United States Patent [19]

Inokuchi et al.

[11] Patent Number: 4,543,492

[45] Date of Patent: Sep. 24, 1985

[54] METHOD AND SYSTEM FOR TERMINATING OPERATION OF AN HVDC INVERTOR

[75] Inventors: Haruhisa Inokuchi, Kunitachi; Takami Sakai, Akishima, both of Japan

[73] Assignee: Tokyo Shibaura Denki Kabushiki Kaisha, Kawasaki, Japan

[21] Appl. No.: 583,362

[22] Filed: Feb. 24, 1984

[30] Foreign Application Priority Data

Feb. 28, 1983 [JP] Japan .................................. 58-32156

[51] Int. Cl.$^4$ .............................................. H02J 3/36
[52] U.S. Cl. ...................................... 307/82; 307/86; 363/35; 363/51
[58] Field of Search ............... 307/45, 82, 86; 363/35, 363/57, 58

[56] References Cited

U.S. PATENT DOCUMENTS

| | | | |
|---|---|---|---|
| 3,543,045 | 11/1970 | Hammarlund et al. ............ | 307/82 |
| 3,737,763 | 6/1973 | Chadwick ........................... | 363/57 |
| 3,881,147 | 4/1975 | Ueda et al. ......................... | 363/57 |
| 3,883,791 | 5/1975 | Zelina et al. ....................... | 363/87 |
| 4,419,591 | 12/1983 | Irokawa et al. .................... | 307/82 |

FOREIGN PATENT DOCUMENTS

| | | | |
|---|---|---|---|
| 32355 | 3/1978 | Japan ................................... | 363/35 |
| 728210 | 4/1980 | U.S.S.R. ............................. | 363/58 |

*Primary Examiner*—William H. Beha, Jr.
*Attorney, Agent, or Firm*—Schwartz, Jeffery, Schwaab, Mack, Blumenthal & Evans

[57] ABSTRACT

In a method and a system for terminating inverter operation of a converting device connected to a DC power transmission system and having a bridge connection of thyristor valves, absence of a current flowing through the converting device is detected to provide an absence detection signal indicative of such absence, and the absence detection signal is used as one condition for effecting termination of the inverter operation. According to the invention, the absence is found when all the valves in at least one of the lower potential side and the higher potential side are found concurrently non-conducting, and each valve is found non-conducting when a voltage is found present across each valve.

10 Claims, 11 Drawing Figures (a) GS
(b) FV
(c) RV
(d) OUTPUT OF 11
(e) OUTPUT OF 22

METHOD AND SYSTEM FOR TERMINATING OPERATION OF AN HVDC INVERTOR

BACKGROUND OF THE INVENTION

The present invention relates to a method and a system for terminating inverter operation of a converting device having a bridge connection of thyristor valves and connected to a DC power transmission system, particularly a DC power transmission system having more than two terminals.

FIG. 1 shows an example of a multi-terminal DC power transmission system, i.e., a DC power transmission system having more than two terminals. In the illustrated example, there are four terminals or converting stations 8a, 8b, 8c, 8d. The converting stations 8a–8d are interconnected by a pair of DC lines 7a, 7b forming a DC power transmission system, and are respectively connected to AC power transmission systems 1a, 1b, 1c, 1d. Each converting station comprises a converting device 4a, 4b, 4c, 4d. The AC terminals of each converting device are connected to the AC power transmission system 1a, 1b, 1c, 1d through a transformer 3a, 3b, 3c, 3d and an AC circuit breaker 2a, 2b, 2c, 2d. The DC terminals of each converting device are connected through a reactor 5a, 5b, 5c, 5d to the DC lines 7a and 7b.

Each of the converting devices 4a–4d comprises, as shown in FIG. 2, a bridge connection oil thyristor valves 6u, 6v, 6w, 6x, 6y, 6z. The valves 6u, 6v, 6w have one end connected to a negative line 7b, so that they are called valves of lower potential side. The valves 6x, 6y, 6z have one end connected (through a reactor 5a, 5b, 5c, 5d) to a positive line 7a so that they are called valves of higher potential side. FIG. 2 also shows AC terminals R, S, T for connection with three-phase AC power transmission system (1a–1d in FIG. 1), and DC terminals P, N for connection to the DC lines 7a, 7b through a reactor (indicated by 5 as representative of 5a–5d in FIG. 1). In FIG. 2, $v_d$ denotes DC voltage across the DC terminals P, N and $i_d$ denotes DC current through the DC terminals P, N.

Assume that the converting device in one of the converting stations, say 8d, has been in the inverter operation and it is desired that the inverter operation of the converting device be terminated. Conventionally, the DC current through the converting apparatus 4d is reduced to zero, and upon detection or confirmation of the current being zero, gate pulses are blocked (in other words the converting device is gate-blocked).

However, DC current $i_d$ flowing through the converting device contains, as shown in FIG. 3, ripples because of the DC voltage $v_d$ of the converting device and the DC line voltage $v_{dL}$ beyond the reactor 5d, so that it is very difficult to detect the current being zero.

In addition, if the gate pulses are blocked while the DC current $i_d$ is still flowing, as shown in FIG. 3, the interruption of the current need to be completed during the period of $t_1-t_2$ when the DC voltage $v_d$ is greater (in magnitude) than the line voltage $v_{dL}$ as shown by hatching in FIG. 3. After $t_2$, $v_d$ becomes smaller than $v_{dL}$. If the interruption is not completed by $t_2$, a very large current, shown by dotted line, flows through the converting device whose gate pulses are blocked.

It is thus seen that it is vital to make sure that the DC current is zero prior to blocking the gate pulses for termination of the inverter operation of a converting device in a DC power transmission system. If the gate pulses are blocked while the DC current is still flowing, an excessive current flows, which may cause a serious breakdown necessitating interruption of the operation of the entire DC power transmission line.

SUMMARY OF THE INVENTION

An object of the invention is to provide a method and a system for terminating the inverter operation of a converting device, which enable more reliable detection of the DC current being zero, and minimize the risk of an excessive current flowing through the converting device.

According to one aspect of the invention, there is provided a method for terminating inverter operation of a converting device connected to a DC power transmission system and having a bridge connection of thyristor valves, comprising the steps of:

detecting absence of a current flowing through the converting device to provide an absence detection signal indicative of such absence, and using said absence detection signal as one condition for effecting termination of the inverter operation, wherein said step of detecting absence comprises detecting non-conduction of all the valves in at least one of the lower potential side and the higher potential side to find said absence of a current when said all the valves are found concurrently non-conducting, and the detection of non-conduction of each valve comprises detecting a voltage across the valve to find the non-conduction when the voltage is found present.

According to another aspect of the invention, there is provided a system for terminating inverter operation of a converting device connected to a DC power transmission system and having a bridge connection of thyristor valves, comprising:

means for detecting absence of a current flowing through the converting device to produce an absence detection signal indicative of such absence, means using said absence detection signal as one condition for effecting termination of the inverter operation, wherein said means for detecting absence comprises means for detecting non-conduction of all the valves in at least one of the lower potential side and the higher potential side to find said absence of a current when said all the valves are found concurrently non-conducting, and said means for detecting non-conduction comprises means for detecting a voltage across each valve to find the non-conduction when the voltage is found present.

DETAILED DESCRIPTION OF THE PREFERRED EMBODIMENTS

Embodiments of the invention will now be described with reference to FIGS. 4–11.

Figure 1:
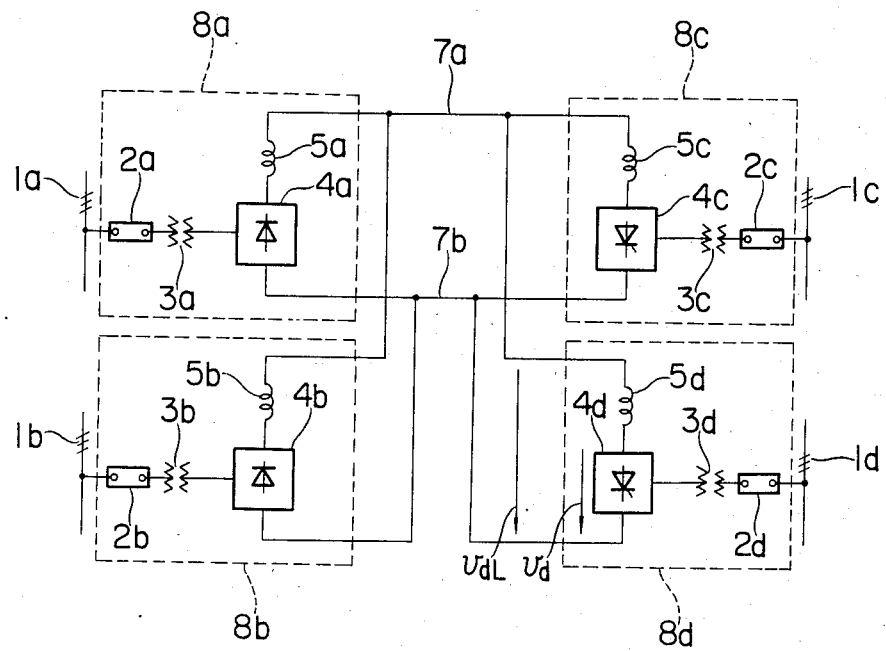
FIG. 1 is a schematic diagram showing an example of a DC power system having more than two terminals.
Figure 2:
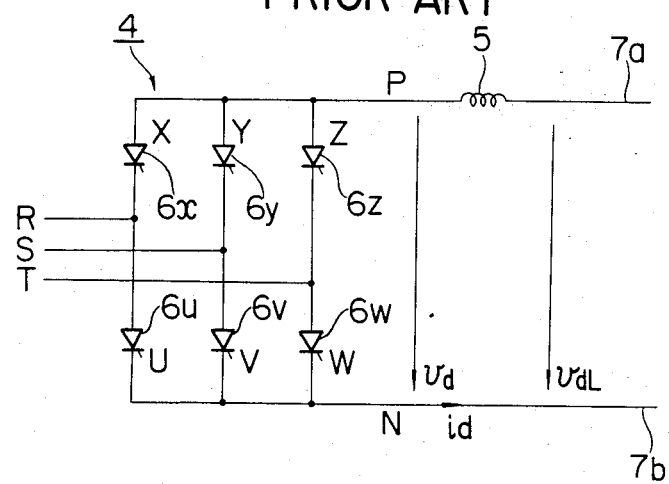
FIG. 2 is a circuit diagram showing a converting device usable in the system of FIG. 1.
Figure 3:
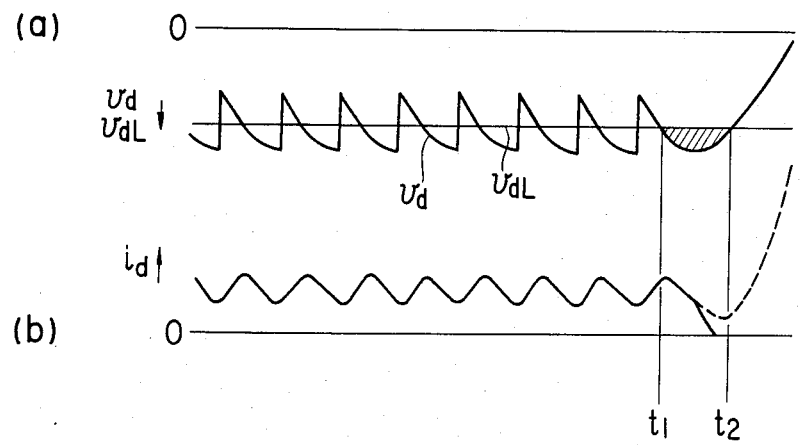
FIG. 3 shows a DC current and a voltage in the converting device in operation.
Figure 4:
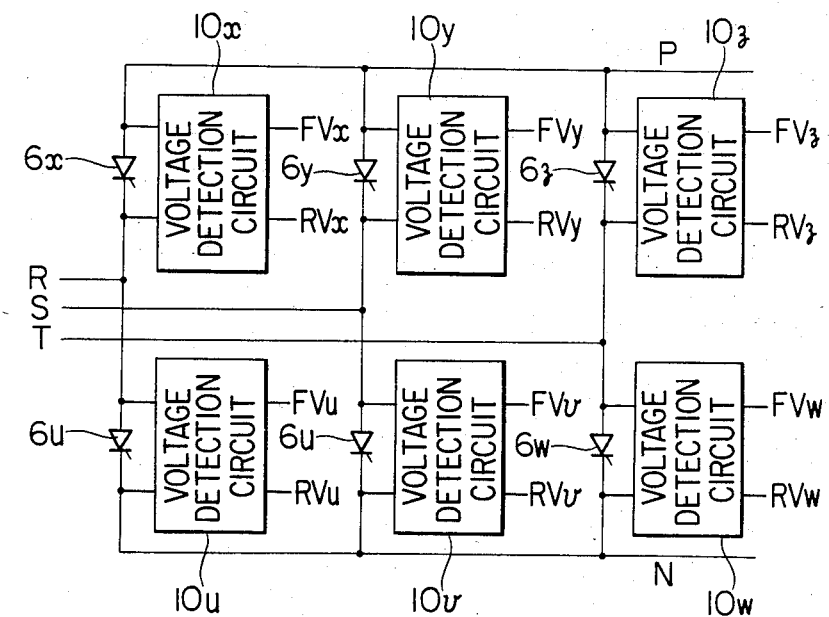
FIG. 4 is a diagram showing voltage detection circuits incorporated in the converting device.

FIG. 4 shows a converting device 4 similar to that shown in FIG. 2 and the converting device 4 similarly comprises a bridge connection of thyristor valves $6u$–$6z$. The AC terminals R, S, T and the DC terminals P, N may be similarly connected.

In addition, voltage detection circuits $10u$–$10z$ are provided in association with the thyristor valves $6u$–$6z$ respectively. Each of the voltage detection circuits is provided with a first output terminal $FV_u$–$FV_z$ and a second output terminal $RV_u$–$RV_z$, and produces a logic signal of "1" or forward voltage detection signal at the first terminal $FV_u$–$FV_z$ when it detects a forward voltage across the associated thyristor valve $6u$–$6z$, and a logic signal of "1" or reverse voltage detection signal at the terminal $RV_u$–$RV_z$ when it detects a reverse voltage across the associated thyristor valve $6u$–$6z$.

OR gates $11u$–$11z$ are provided in association with the voltage detection circuits $10u$–$10z$, respectively. Each of the OR gates receives the forward voltage detection signal and the reverse voltage detection signal from the output terminals of the associated voltage detection circuit. Each of the OR gates $11u$–$11z$ thus serves to detect non-conduction of the corresponding valve when either the forward voltage detection signal or the reverse voltage detection signal is being produced.

An AND gate 12 is provided to receive signals from the OR gates $11u$–$11w$. Another AND gate 13 is provided to receive signals from the OR gates $11x$–$11z$. The output of the AND gate 12 is "1" if a voltage (forward or reverse) is present across each of the valves $6u$–$6w$ of the lower potential side. The output of the AND gate 13 is "1" if a voltage is present across each of the valves $6x$–$6z$ of the higher potential side.

A further AND gate 14 is provided to receive output signals from the AND gates 12 and 13. The output signal of the AND gate 14 indicates absence of a current flowing through the converting device and is used as a condition for effecting termination of the inverter operation of the converting device, i.e., for blocking the gate pulses.

In the illustrated embodiment, the output signal of the AND gate 14 is inputted, together with a termination command TER to an AND gate 15. The output signal of the AND gate 15 is used to set an S-R type flip-flop 16, which is adapted to be reset by a start command STA.

The output signal of the flip-flop 16 at the output terminal Q is "1" when the flip-flop 16 is set, and is inverted by an inverter 17. The output signal of the inverter 17 is fed to first terminals of AND gates $18u$–$18z$ provided to receive, at second terminals, gate signals $GS_u$–$GS_z$ provided by a converting device control circuit 9 for the respective phases or valves. The output signals of the AND gates $18u$–$18z$ are amplified by respective pulse amplifiers $19u$–$19z$ and are then applied as gate pulses $GP_u$–$GP_z$ to the gates of the respective valves.

When the flip-flop 16 is set, the output signal of the inverter 17 becomes "0", so that gate signals are blocked by the AND gates $18u$–$18z$ and no gate pulses ($GP_u$–$GP_z$) are produced.

Now the operation of the above-described circuitry is described.

Figure 7:
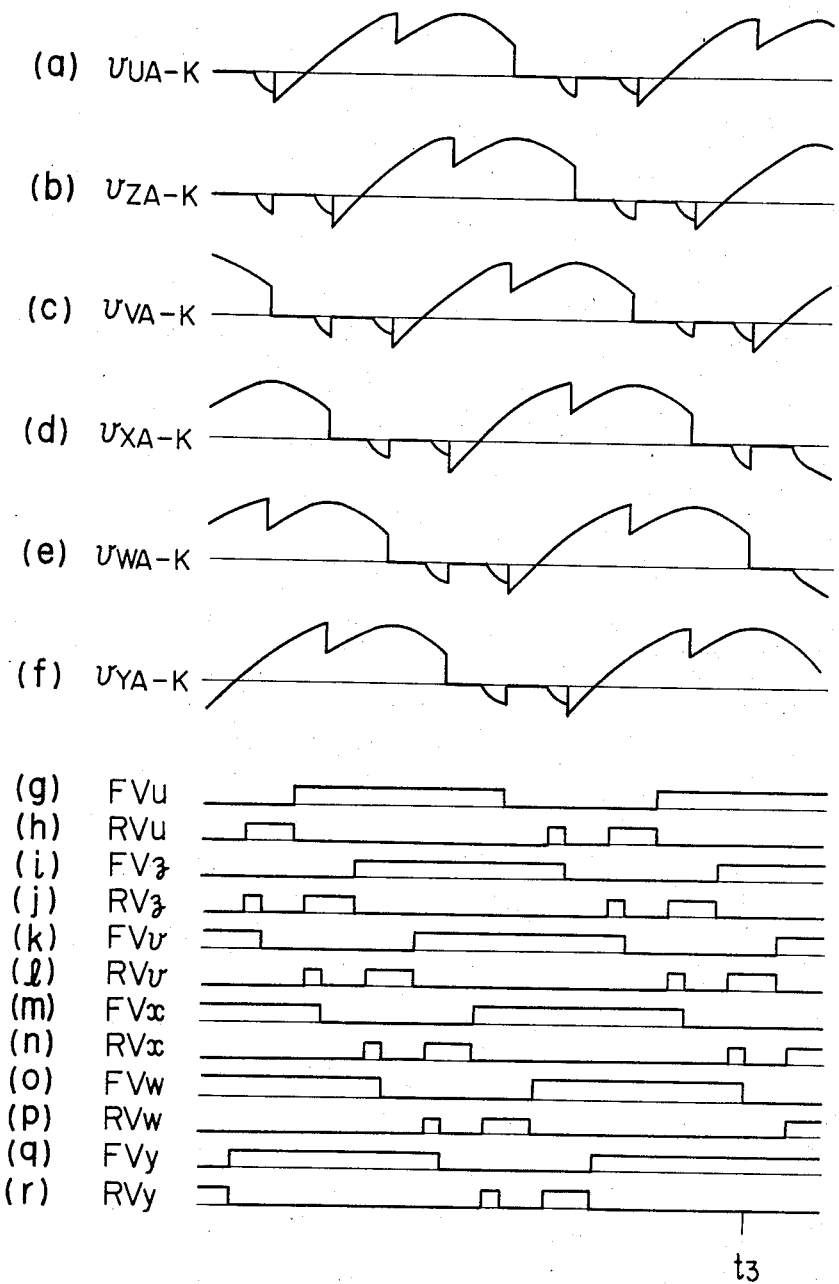

Generally, when the DC current $i_d$ of the converting device 4 is intermittent as shown in FIG. 6(a), the voltage $V_{A-K}$ across the anode and the cathode of a valve (any one of $6u$–$6z$) is as shown in FIG. 6(b). The various valves $6u$–$6z$ have similar voltage waveforms $V_{uA-K}$–$V_{zA-K}$, but of different phases, as shown in FIGS. 7(a)–(f). FIG. 7 also shows, at (g)–(r), logic signals outputted by the voltage detection circuits $10u$–$10z$.

Figure 5:
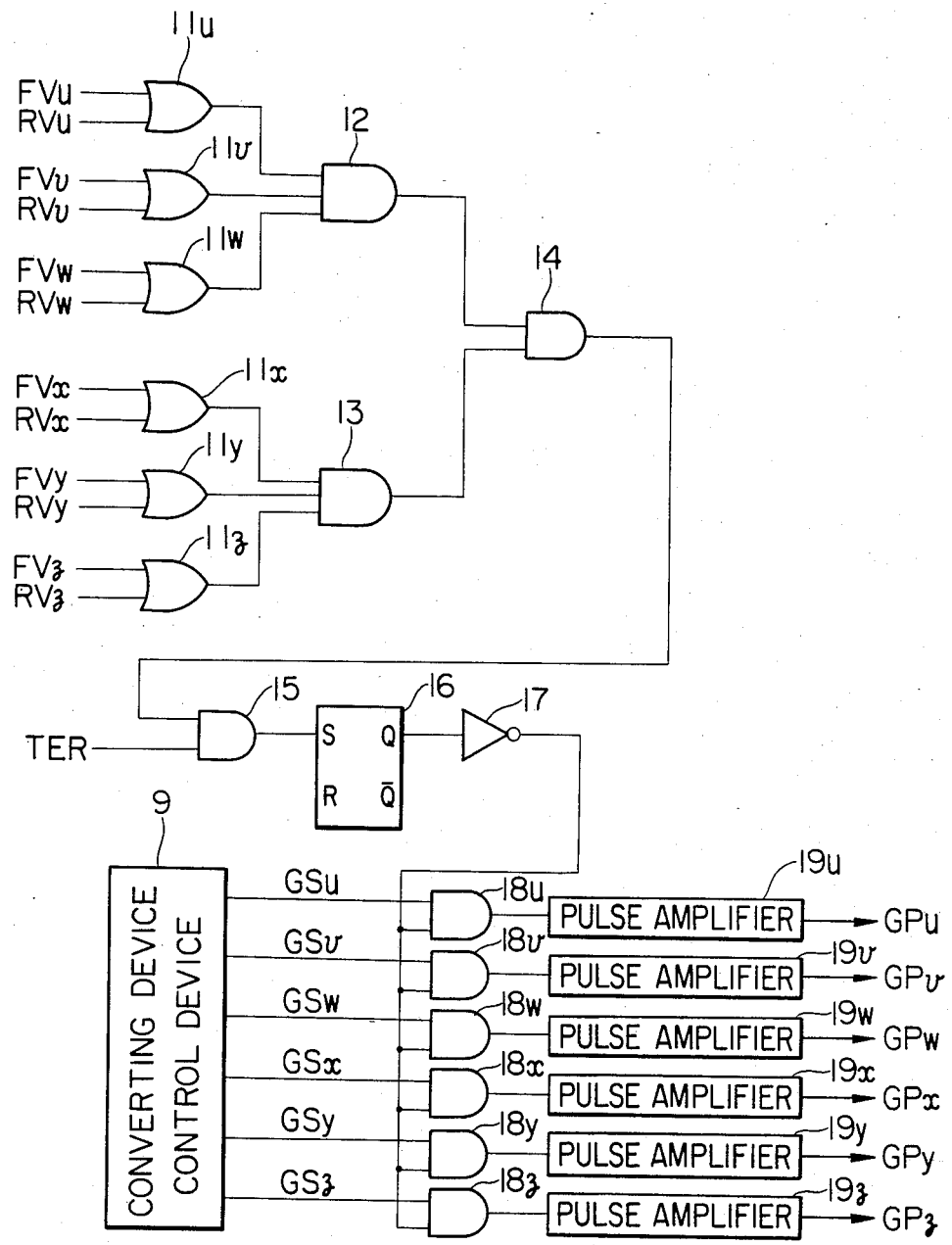
FIG. 5 is a block diagram showing an example of control circuit for blocking gate pulses.
Figure 6:
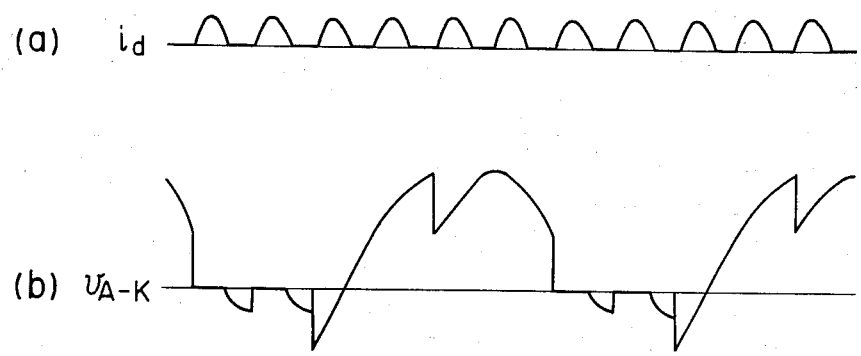
FIGS. 6 through 8 show voltages and currents at the various parts of the system.
Figure 8:
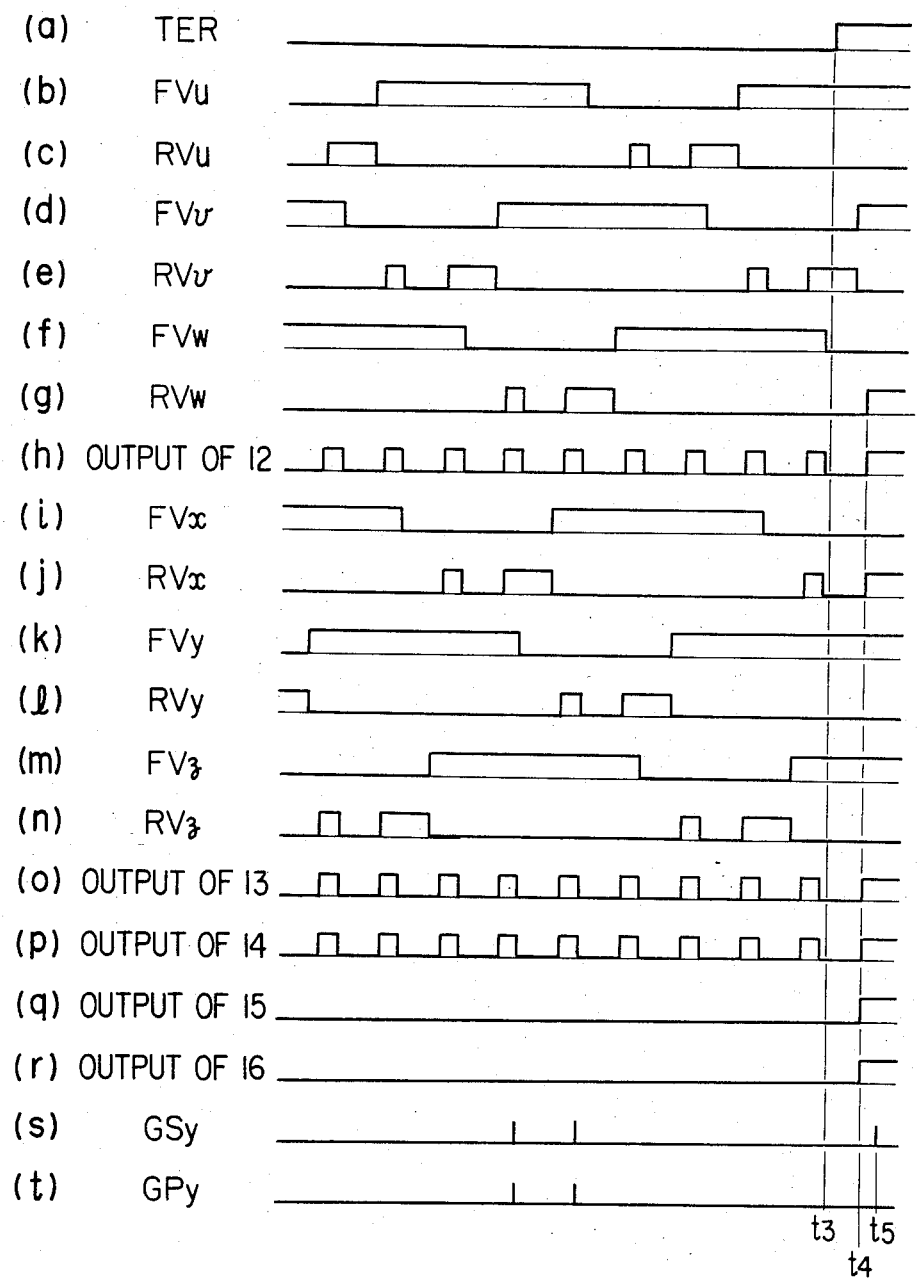

FIG. 8 shows signals at various parts of the circuitry of FIG. 5, before and after the production of termination command TER.

In FIG. 8, it is assumed that a termination command TER is issued at a time point $t_3$, when the W-phase valve $6w$ has just been fired and the W-phase valve $6w$ and the X-phase valve $6x$ are conducting, while the remaining valves are non-conducting.

At a time point $t_4$, the DC current becomes zero, and a reverse voltage is applied on the W-phase valve $6w$ and the X-phase valve $6x$, so that the signals at the terminals $RV_w$ and $RV_x$ become "1".

Before the time point $t_4$, the U-phase valve $6u$ is not conducting and a forward voltage is applied on it, so that the signal on the terminal $FV_u$ is at "1", and the signal at the terminal $FV_v$ for the V-phase valve $6v$ is also at "1". As a result, all the inputs to the AND gate 12 become "1" at the time point $t_4$, meaning that all the valves $6u$–$6w$ of the lower potential side are non-conducting, and the output of the AND gate 12 becomes "1" indicating such a fact. Similarly, the signals at the terminals $RV_x$, $FV_y$ and $FV_z$ are at "1", and the output of the AND gate 13 becomes "1". This in turn causes the output of the AND gate 14 to become "1", indicating that all the valves are non-conducting. Since, as assumed, the termination command is now being applied, the output of the AND gate 15 also becomes "1", and the flip-flop 16 is thereby set.

When flip-flop 16 is set, a logic signal "0" is applied to the first inputs of the AND gates $18u$–$18z$. The gate pulses, which would otherwise be continued to be produced thereafter, e.g., at $t_5$ for the Y-phase valve, are blocked.

In summary, in the embodiment described above, non-conduction of each of the valves is ascertained by detection of the presence of either forward or reverse voltage across the valve, and when all the valves are found to be non-conducting, absence of a current flowing through the converting device is detected or recognized, and gate pulses are blocked. Thus, it is ensured that the valves are kept non-conducting thereafter. Accordingly, the danger of an excessive current flowing through the converting device is minimized.

In the embodiment described, detection is made to ascertain the presence of a forward or reverse voltage on all the valves in the lower potential side as well as all the valves in the higher potential side. But, the current must flow through at least one of the valves in the lower potential side and through at least one of the valves in the higher potential side. So that it is, in practice, sufficient to ascertain the presence of a voltage on all the valves of either the lower potential side or of the higher potential side. The AND gate 14 may therefore be replaced by an OR gate, or either the voltage detection circuits $10u$–$10w$ for the lower potential side or the voltage detection circuits 10x–10z for the higher potential side may be omitted.

Figure 9:
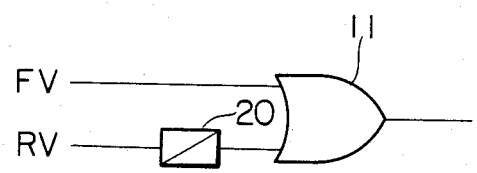
FIGS. 9 and 10 show modifications of the invention.

As a modification, an ON-delay timer 20 may be inserted, as shown in FIG. 9, between the output terminal RV of the voltage detection circuit 10 (as representing 10u–10z) and the OR gate 11 (as representing 11u–11z). This is to make sure that the reverse voltage is applied on the thyristor for longer than the turn-off time of the thyristor, and the turn-off of the thyristor is completed, before the signal is actually applied to the OR gate 11 and the gate pulses are actually blocked. Such an ON delay timer may alternatively be inserted at the output of the OR gates 11u–11z or at the output of the AND gates 12, 13.

Figure 10:
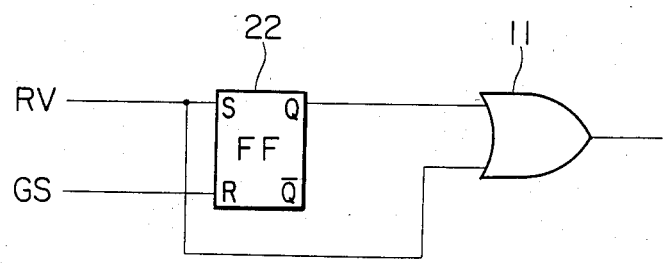
Figure 11:
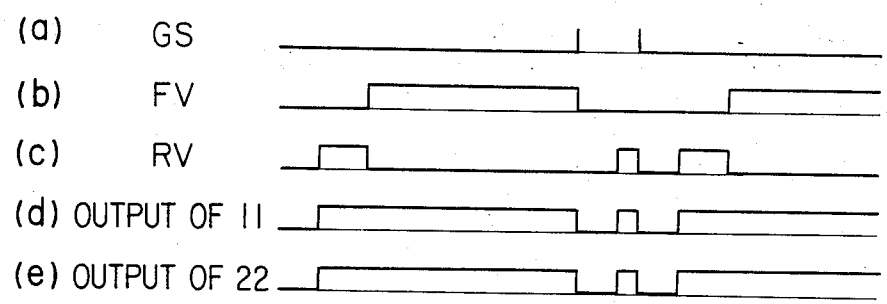
FIG. 11 shows signals at various parts of the system of FIG. 10.

FIG. 10 shows a different arrangement for detecting the non-conduction of a valve. As shown, an S-R type flip-flop 22 is used for each valve, and the signal at the terminal RV is applied to a set input terminal S of the flip-flop 22. Applied to the reset input terminal R is a gate signal GS to be supplied to the associated valve. The OR gate 11 is connected to receive the signal at the terminal RV and the signal at the terminal Q of the flip-flop 22 which is "1" when the flip-flop 22 is set.

The signals at various parts of the circuitry of FIG. 10 as connected to most of the circuitry of FIGS. 4 and 5 are shown in FIG. 11(a)–(e). As shown, when a gate pulse is applied, the forward voltage disappears (or is kept absent). During such time that the forward voltage is not present, it is sufficient to detect presence of a reverse voltage to ascertain non-conduction of the valve. The embodiment of FIG. 10 is based on this concept, and utilizes a flip-flop 22 which is reset by the gate signal. The ouput of the OR gate 11 therefore indicates, when it is "1", that the associated valve is non-conducting.

For simplicity of illustration, the voltage detection circuit has been shown to detect a voltage across the entire valve. But each valve may consist of a number of thyristors connected in series with each other. In such a case, a voltage across one or some of thyristors may be detected and used for the detection of the presence of the voltage across the valve.

In the illustrated embodiments, the converting device comprises only one bridge connection of thyristor valves. But it may alternatively comprise a plurality of bridge connections connected in series with each other.

What is claimed is:

1. A method for terminating inverter operation of a converting device connected to a DC power transmission system and having a bridge connection of thyristor valves, comprising the steps of:
detecting absence of a current flowing through the converting device to provide an absence detection signal indicative of such absence, and
using said absence detection signal as one condition for effecting termination of the inverter operation,
wherein said step of detecting absence comprises detecting non-conduction of all the valves in at least one of the lower potential side and the higher potential side to find said absence of a current when said all the valves are found concurrently non-conducting, and
the detection of non-conduction of each valve comprises detecting a voltage across the valve to find the non-conduction when the voltage is found present.

2. A method as set forth in claim 1, wherein said step of detecting a voltage across the valve comprises detecting both forward and reverse voltages to find non-conduction of the valve when either forward or reverse voltage is found present.

3. A method as set forth in claim 1, wherein said step of detecting a voltage across the valve comprises detecting a reverse voltage across the valve during an interval after application of a gate pulse to the valve and until subsequent application of a gate pulse to another valve.

4. A method as set forth in claim 1, wherein said step of using the absence detection signal comprises using the absence detection signal as one condition for blocking gate pulses.

5. A system for terminating inverter operation of a converting device connected to a DC power transmission system and having a bridge connection of thyristor valves, comprising:
means for detecting absence of a current flowing through the converting device to produce an absence detection signal indicative of such absence,
means using said absence detection signal as one condition for effecting termination of the inverter operation,
wherein said means for detecting absence comprises means for detecting non-conduction of all the valves in at least one of the lower potential side and the higher potential side to find said absence of a current when said all the valves are found concurrently non-conducting, and
said means for detecting non-conduction comprises means for detecting a voltage across each valve to find the non-conduction when the voltage is found present.

6. A system as set forth in claim 5, wherein said means for detecting a voltage comprises voltage detection circuits provided in association with the respective valves to detect a voltage across the associated valve.

7. A system as set forth in claim 6, wherein
each of the voltage detection circuits is adapted to produce a forward voltage detection signal when it finds a forward voltage present and to produce a reverse voltage detection signal when it finds a reverse voltage present, and
said means for detecting non-conduction is adapted to find non-conduction of each valve when either of the forward voltage detection signal or the reverse voltage detection signal is being produced.

8. A system as set forth in claim 6, wherein
each of the voltage detection circuits is adapted to produce a reverse voltage detection signal when it finds a reverse voltage present,
said means for detecting non-conduction comprises flip-flops provided in association with the respective voltage detection circuits and hence with the respective valves, each of the flip-flops being adapted to be reset upon application of a gate pulse to the associated valve and to be set by the reverse voltage detection signal from the associated voltage detection circuit, and
said means for detecting non-conduction further comprises means for finding non-conduction of each valve either when the associated voltage detection circuit is producing the reverse voltage detection signal or when the associated flip-flop is being set.

9. A system as set forth in claim 5, wherein said means for using the absence detection signal is adapted to use the absence detection signal as one condition for blocking gate pulses.

10. A system as set forth in claim 9, further comprising means for delaying initiation of blocking of the gate pulses after detection of the absence of the current by said means for detecting absence to make sure that time longer than the turn-off time of the valve elapses before the gate pulses are actually blocked.

* * * * *